US008380978B2

(12) United States Patent  (10) Patent No.: US 8,380,978 B2
Kuhls et al.  (45) Date of Patent: Feb. 19, 2013

(54) ELECTRICAL SYSTEM OF A MOTOR VEHICLE WITH A MASTER SECURITY MODULE

(75) Inventors: Burkhard Kuhls, Stadtbergen (DE); Josef Wagenhuber, Gerolsbach (DE); Marc Lindlbauer, Munich (DE); Hans-Ulrich Breme, Rohrbach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1110 days.

(21) Appl. No.: 12/329,232

(22) Filed: Dec. 5, 2008

(65) Prior Publication Data

US 2009/0217031 A1 Aug. 27, 2009

(30) Foreign Application Priority Data

Dec. 7, 2007 (DE) .......................... 10 2007 058 975

(51) Int. Cl.
 *H04L 29/06* (2006.01)
(52) U.S. Cl. .................... 713/153; 713/150; 713/154
(58) Field of Classification Search .................. None
 See application file for complete search history.

(56) References Cited

U.S. PATENT DOCUMENTS

| 2002/0023223 | A1* | 2/2002 | Schmidt et al. | 713/187 |
|---|---|---|---|---|
| 2006/0143472 | A1* | 6/2006 | Feilen et al. | 713/189 |
| 2008/0263363 | A1* | 10/2008 | Jueneman et al. | 713/184 |
| 2010/0031042 | A1* | 2/2010 | Di Crescenzo et al. | 713/169 |
| 2011/0145564 | A1* | 6/2011 | Moshir et al. | 713/154 |

FOREIGN PATENT DOCUMENTS

| DE | 19723332 | A1 | 9/1998 |
|---|---|---|---|
| DE | 10008973 | A1 | 9/2001 |
| DE | 10141737 | C1 | 4/2003 |
| DE | 10213658 | A1 | 10/2003 |
| DE | 10238095 | A1 | 3/2004 |
| DE | 102004036810 | A1 | 3/2006 |

OTHER PUBLICATIONS

Document: draft-ietf-smime-aes-alg-00.txt Use of the Advanced Encryption Algorithm in CMS, Schaad; Nov. 2000.*
Microsoft RFID Technology Overview Javed Sikander, Microsoft Corporation, Nov. 2004.*
Java (Version 1.4.2) TM Cryptography Architecture API Specification & Reference Last Modified: Aug. 4, 2002.*
Menezes, et al., Chapter One—Overview of Cryptography, Handbook of Applied Cryptography, 1997, 14 pages, CRC Press LLC, Boca Raton, FL, USA.

* cited by examiner

*Primary Examiner* — David Y Jung
(74) *Attorney, Agent, or Firm* — Barley Snyder

(57) ABSTRACT

The invention relates to an electrical system of a motor vehicle with control apparatuses, which communicate with one another by means of a data bus. To recognize manipulations to the electrical system of a motor vehicle, in particular on the software of the control apparatuses of the electrical system, and to derive suitable measures, it is proposed that a master security module is provided in a first control apparatus and a client security module is provided in each case in a plurality of the further second control apparatuses, and the master security module of the first control apparatus, preferably a central gateway control apparatus, signs a message and sends the signed message to at least one of the second control apparatuses by means of the data bus. The client security module of the second control apparatus checks the signed message received from the master security module as to whether it comes from an authorized master security module.

20 Claims, No Drawings

ELECTRICAL SYSTEM OF A MOTOR VEHICLE WITH A MASTER SECURITY MODULE

CROSS-REFERENCE TO RELATED APPLICATIONS

This application claims the benefit of the filing date under 35 U.S.C. §119(a)-(d) of German Patent Application No.: 102007058975.3, filed Dec. 7, 2007.

FIELD OF THE INVENTION

The invention relates to an electrical system of a motor vehicle with control apparatuses, which communicate with one another over a data bus.

BACKGROUND

It is known to carry out a signature check during the programming of control apparatuses of a motor vehicle. An exchange of an original control apparatus for a control apparatus that is provided with modified software or hardware cannot generally be recognised by the known vehicle electrical systems.

An object of the invention is the recognition of manipulations to the electrical system of a motor vehicle, in particular to the software of the control apparatuses of the electrical system and the derivation of suitable measures.

SUMMARY

This and other objects are achieved by an electrical system of a motor vehicle with control apparatuses, which communicate with one another over a data bus. According to the invention a master security module is provided in a first control apparatus and a client security module is provided in each of a plurality of the further second control apparatuses. The master security module of the first control apparatus, for example, a central gateway control apparatus, signs a message and sends the signed message to at least one of the second control apparatuses over the data bus. The client security module of the second control apparatus checks the signed message received from the master security module as to whether it comes from an authorised master security module.

In a development of the invention, it is provided that the master security module exchanges a secret symmetrical communication key with the client security modules to encrypt the communication between the master security module and the client security module, preferably an AES key.

DETAILED DESCRIPTION OF THE EMBODIMENT(S)

In an embodiment of the invention, the exchange of a secret symmetrical key is initiated by one or more diagnostic commands, preferably in the manufacture thereof or in a facility of the vehicle producer. Security against manipulations is additionally increased by the developments of the invention.

In one embodiment of the invention the transmission of the secret symmetrical code is secured by one or more transport keys, which the supplier of the control apparatus having the client security module has introduced in advance into a secure memory of the control apparatus. The memory is preferably protected against reading and against overwriting and the transport key is preferably a symmetrical AES key. The securing of the transmission can be implemented economically according to the invention and nevertheless securely.

In a configuration of the invention the master security module encrypts a communication key with the transport key and the encrypted communication key is transmitted to at least one client security module. The encrypted communication key is decrypted using the transport key stored in the secure memory of the corresponding second control apparatus and the second control apparatus uses the communication key obtained during the decryption to encrypt messages, which the second control apparatus sends to the master security module. This measure leads to an additional increase in the security against manipulation.

In a development of the invention, communication keys produced by the master security module and encrypted with the transport key are derived from a symmetrical AES key, the AES key being a master key and a suitable communication key being derived in each case for at least the predominant part of the client security modules. Favorable key logistics can be implemented by this measure according to the invention.

In a configuration of the invention each of the second control apparatuses having a client security module has a diagnostic address and the diagnostic address is entered into the derivation of the respective communication key. It is thus ensured that the exchanged communication keys are both individual to the vehicle and also individual to the control apparatuses. The second control apparatuses having a client security module, each have another communication key so that second control apparatuses with different communication keys may be installed in the same vehicle.

The master security module has a data interface secured against manipulations, by means of which data interface transport keys are transmitted and are stored in the first control apparatus, protected against reading and overwriting. The electrical system according to the invention is thus achieved in an economical manner that can be easily maintained, in particular by the transmission of new transport keys.

In an embodiment of the invention the master security module and a client security module, in each case, are authenticated on the basis of a communication key, the client security module, on the recognition of a fault, may notify the master security module.

In a configuration of the invention a fingerprint or hash value of a specific memory region of the second control apparatus with the client security module is exchanged between the master security module and a client security module and a change in this memory region, in particular during driving operation, is monitored. As a result, manipulations can be recognized and prevented.

In one embodiment of the invention the master security module manages an individual key pair, preferably an RSA key pair, and an associated certificate, in particular an X.509 certificate, and the vehicle provided with the master security module is authenticated with respect to an authority external to the vehicle.

In an embodiment of the invention the master security module and/or the client security module provides a programming interface or an application programming interface with cryptographic functions, which are used by software applications within the vehicle.

Memory-intensive and calculation-intensive asymmetrical cryptographic methods preferably only take place between the master security module of the first control apparatus and a mechanism external to the vehicle. This takes place, for example, during the wireless transmission of new software into a control apparatus during maintenance or repair in a so-called teleservice process. During the exchange of data between the first control apparatus and the second control apparatus, few memory-intensive and calculation-intensive symmetrical cryptographic processes are preferably used. The memory requirement for a security platform in the vehicle is thus minimised.

In one configuration of the invention the client security module is a part of the software standard core of the second control apparatus.

In a development of the invention, while the vehicle is travelling, the master security module causes the client security modules, for example, once per travel cycle, to check the software signature of the control apparatus sequence controls or control apparatus programs contained in the second control apparatuses and the result of the check is transmitted to the master security module. As a result, the calculation resources of the electrical system according to the invention are conserved and costs saved and an adequately regular check for manipulations is nevertheless achieved.

In an embodiment of the invention in the case of a differing software signature, a corresponding diagnostic message is provided in the vehicle, in particular on the data bus of the vehicle.

In a development of this embodiment the provision of the corresponding diagnostic message of at least one of the second control apparatuses having the client security module, or a third control apparatus without a client security module, causes a predetermined measure to be carried out. In a configuration of the invention the measure consists in indicating a corresponding warning signal to the driver or activating an immobiliser after the vehicle has been turned off. A manipulation of control apparatuses or an unauthorised exchange of a control apparatus can be reliably recognized.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. An electrical system of a motor vehicle with control apparatuses, which communicate with one another over a data bus, comprising:
a master security module in a first control apparatus and a client security module in each of a plurality of the further second control apparatuses,
the master security module of the first control apparatus, signs a message and sends the signed message to at least one of the second control apparatuses over the data bus,
the client security module of the second control apparatus checks the signed message received from the master security module as to whether it comes from an authorized master security module.

2. The electrical system of claim 1 wherein the control apparatus is a central gateway control apparatus.

3. The electrical system according to claim 2, wherein the master security module exchanges a secret symmetrical communication key with the client security modules to encrypt the communication between the master security module and the client security module, preferably an AES key.

4. The electrical system according to claim 3, wherein the exchange of the secret symmetrical key is initiated by one or more diagnostic commands.

5. The electrical system according to claim 4, wherein the exchange of the secret symmetrical key is initiated by one or more diagnostic commands in the manufacture thereof.

6. The electrical system according to claim 4, wherein the exchange of the secret symmetrical key is initiated by one or more diagnostic commands in a facility of the vehicle producer.

7. The electrical system according to claim 4 wherein the transmission of the secret symmetrical key is secured by one or more transport keys, which the supplier of the control apparatus having the client security module has introduced in advance into a secure memory of the control apparatus, which memory is protected against reading and against overwriting, and the transport key is a symmetrical AES key.

8. The electrical system according to claim 7 wherein the master security module encrypts a communication key with the transport key and the encrypted communication key is transmitted to at least one client security module and is decrypted using the transport key stored in the secure memory of the corresponding second control apparatus, and the second control apparatus uses the communication key obtained during the decryption to encrypt messages, which the second control apparatus sends to the master security module.

9. The electrical system according to claim 8 wherein the communication keys produced by the master security module and encrypted with the transport key are derived from a symmetrical AES key, the AES key being a master key and a suitable communication key being derived in each case for at least the predominant part of the client security modules.

10. The electrical system according to claim 9 wherein each of the second control apparatuses having a client security module has a diagnostic address and the diagnostic address is entered into the derivation of the respective communication key.

11. The electrical system according to claim 10 wherein the master security module has a data interface secured against manipulations, by means of which data interface the transport keys are transmitted and stored in the first control apparatus, protected against reading and overwriting.

12. The electrical system according to claim 11 wherein the master security module and a client security module, in each case, are authenticated on the basis of a communication key, the client security module, on detecting a fault, notifying the master security module.

13. The electrical system according to claim 12 wherein a fingerprint or hash value of a specific memory region of the second control apparatus with the client security module is exchanged between the master security module and a client security module and a change in this memory region is monitored, in particular during travelling operation.

14. The electrical system according to claim 13 wherein the master security module manages an individual key pair, preferably an RSA key pair, and an associated certificate, in particular an X.509 certificate and the vehicle provided with the master security module is authenticated to an authority external to the vehicle.

15. The electrical system according to claim 14 wherein the master security module and/or the client security module provides a programming interface or an application programming interface with cryptographic functions, which are used by software applications within the vehicle.

16. The electrical system according to claim 15 wherein the client security module is a part of the software standard core of the second control apparatus.

17. The electrical system according to claim 16 wherein the master security module causes the client security module, while the vehicle is travelling, to check the software signature of the control apparatus sequence controls or control apparatus programs contained in the second control apparatuses and the result of the check is transmitted to the master security module.

18. The electrical system according to claim 17 wherein in the event of a differing software signature, a corresponding diagnostic message is provided in the vehicle, in particular on the data bus of the vehicle.

19. The electrical system according to claim 18 wherein the provision of the corresponding diagnostic message of at least one of the second control apparatuses having the client security module, or a third control apparatus without a client security module, causes a predetermined measure to be carried out.

20. The electrical system according to claim 19 wherein the measure comprises indicating a corresponding warning signal to the driver or activating an immobiliser after the vehicle has been turned off.

* * * * *